United States Patent [19]

Wrue

[11] 3,896,688

[45] July 29, 1975

[54] METHOD OF EDGING A NON-RIGID LENS

[75] Inventor: Richard J. Wrue, Rochester, N.Y.

[73] Assignee: Bausch & Lomb Incorporated, Rochester, N.Y.

[22] Filed: Dec. 17, 1973

[21] Appl. No.: 425,414

Related U.S. Application Data

[62] Division of Ser. No. 271,431, July 13, 1972, Pat. No. 3,832,920.

[52] U.S. Cl. .................................. 82/1 C; 264/1
[51] Int. Cl. ..................... B23b 3/00; B29d 11/00
[58] Field of Search ............... 82/1, 1 C, 14, 19, 11; 264/1

[56] References Cited
UNITED STATES PATENTS

| | | | |
|---|---|---|---|
| 2,237,744 | 4/1941 | Mullen | 82/1 C |
| 3,030,859 | 4/1962 | Elliott, Jr. | 82/1 C X |
| 3,064,531 | 11/1962 | Bullock | 82/1 C |
| 3,301,105 | 1/1967 | Morris | 82/19 X |

Primary Examiner—Harrison L. Hinson
Attorney, Agent, or Firm—Frank C. Parker; DeWitt M. Morgan

[57] ABSTRACT

Apparatus for and method of edging a lens while it is firmly supported or secured in a mold. When unsupported the lens is non-rigid. The preferred embodiment includes a rotatable shaft supported at one end by an electric motor and carrying a knife or cutter at its unsupported free end. Slidably supported on the free end of the shaft is a chuck housing including a sleeve portion and a holder or chuck portion. The chuck portion is dimensioned to receive the end of a lens mold containing the lens cavity so as to position the peripheral edge of the lens and the adjoining face of the mold opposite the rotating knife. A suitable source of vacuum is coupled to the chuck housing adjacent the chuck portion to remove chips generated in the cutting operation. The vacuum may also be used to hold the lens and mold assembly in place. Movement of the chuck portion towards the cutter results in the removal of a portion of the peripheral edge of the supported lens and a corresponding amount of the exposed adjacent surface of the lens mold.

2 Claims, 4 Drawing Figures

PATENTED JUL 29 1975　　3,896,688
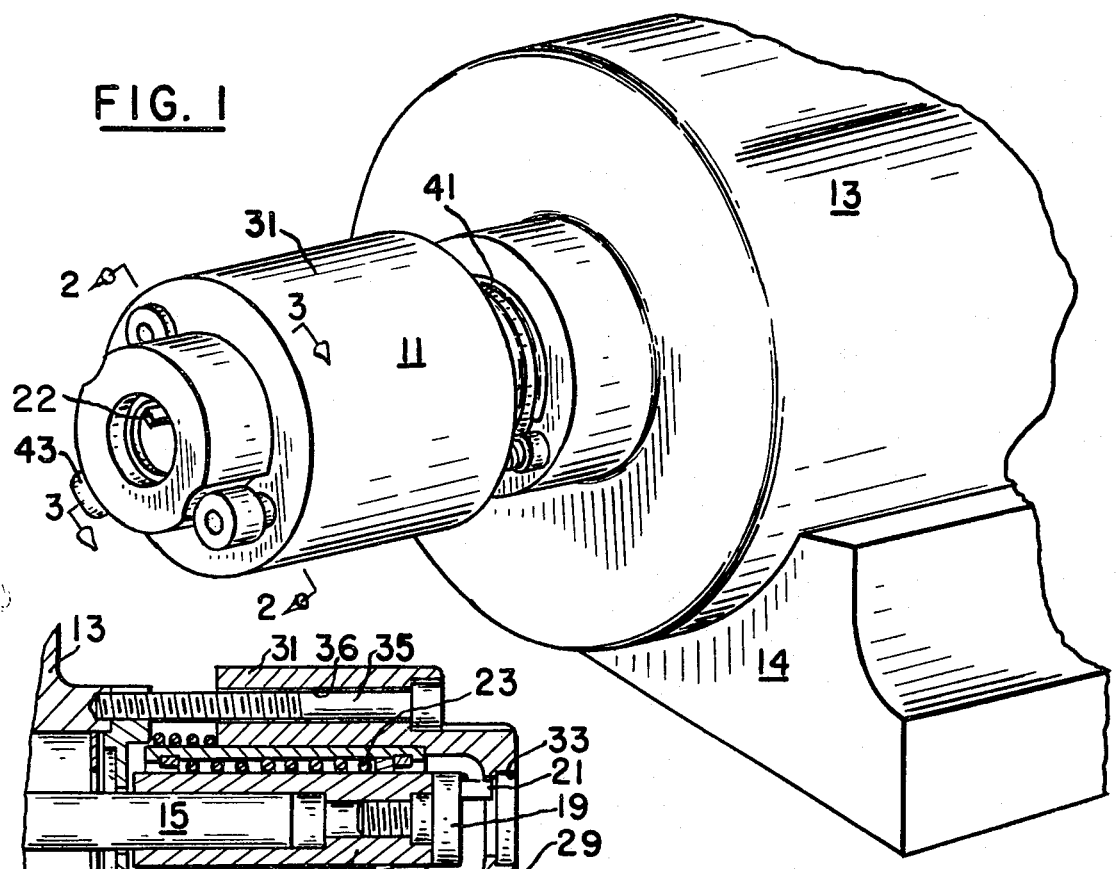
FIG. 1
FIG. 2
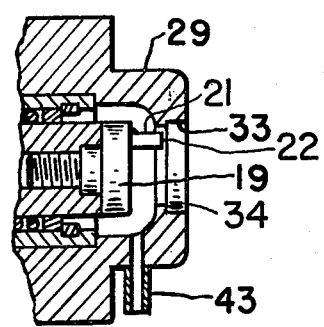
FIG. 3
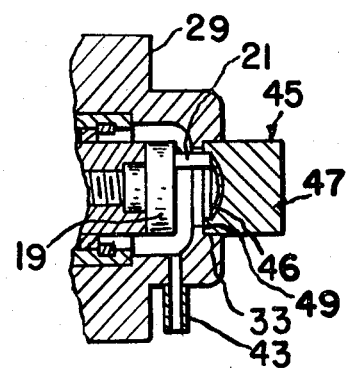
FIG. 4

METHOD OF EDGING A NON-RIGID LENS

This is a division, of application Ser. No. 271,431, filed July 13, 1972, now U.S. Pat. No. 3,832,920.

BACKGROUND OF THE INVENTION

1. Field of the Invention

This invention relates to a method of edging a non-rigid lens while it is secured to a mold member and to an apparatus for moving such a lens into a rotating cutter to remove a portion of the edge of the lens. The lens in an unsupported state is flexible or non-rigid.

2. Description of the Prior Art:

Early methods in the flexible ophthalmic lens manufacturing industry included hand finishing of the non-rigid contact lens. This proved time consuming and expensive and hence entirely unsatisfactory for mass production.

U.S. Pat. No. 3,423,886 entitled "Method of Machining Non-Rigid Contact Lenses" issued to F. Schpak et al is directed to edge contouring of non-rigid lenses of silicone rubber composition. In this patent lens centering problems are not resolved and the contact lenses are rotated at relatively high speed to prestress the peripheral edge portion sufficiently so as to be stress neutralized when engaged by a forming element during a maching operation.

Attention is also directed to U.S. Pat. No. 3,736,183 for "Apparatus For and Method of Edge Machining Flexible Contact Lenses." While the method disclosed therein was a great improvement over prior art techniques it was time consuming from a mass production standpoint due to the number of handeling steps required.

SUMMARY OF THE INVENTION

A method of edge contouring an ophthalmic lens with a cutter while the lens is secured to a mold member and constitutes therewith a lens and mold assembly. The lens has an edge which is adjacent to an exposed surface of the mold member. The method includes the steps of: (a) orientating the lens and mold assembly relative to the cutter; (b) inducing relative rotational movement between the cutter and the lens and mold assembly; (c) engaging the cutter with the lens and mold assembly; and (d) removing, by cutting away, a portion of the edge of the lens and the adjacent portion of the exposed surface of the lens mold member. The removal of material from the lens edge and the adjacent exposed surface may be accomplished simultaneously.

BRIEF DESCRIPTION OF THE DRAWINGS

FIG. 1 illustrates a perspective view of a preferred embodiment of the flexible lens knife edger apparatus;

FIG. 2 is a sectional view of the knife edger assembly taken along line 2—2 of FIG. 1;

FIG. 3 is a partial sectional view of the knife edger assembly taken along line 3—3 of FIG. 1; and FIG. 4 is a partial sectional view similar to FIG. 3 showing the cutter in engagement with a flexible lens and mold assembly.

DETAILED DESCRIPTION OF THE PREFERRED EMBODIMENT

The illustrated flexible lens knife edger apparatus includes an edger assembly 11 secured to the shaft 15 of a motor 13. The motor 13 and plate 14 constitute the base or support structure for shaft 15.

The rotating shaft 15 is illustrated in FIG. 2. It should be noted, however, that any suitable rotatably supported shaft and drive mechanism may be substituted for shaft 15 and motor 13.

Secured, such as by press fitting, to the free end of shaft 15 is sleeve 17 which supports cutter mount 19 at its right hand end as viewed in FIG. 2. The cutter mount 19 supports knife or cutter 21 on its free end. Cutter 21, which may be made of carbide is secured to the cutter mount 19 at a location that is radially offset from the longitudinal axis of shaft 15 such that cutting edge 22 is disposed in a plane which is perpendicular to the aforesaid longitudinal axis.

Also supported on sleeve 17 is a linear-rotary ball bearing 23 which, in turn, supports a chuck housing, generally designated 29. Chuck housing 29 consists of a sleeve portion 31 and a chuck or holder portion 33. As is evident from inspection of the drawings chuck portion 33 takes the form of a circular opening having an internal shoulder 34 the face of which lies in a plane which is perpendicular to the axis of chuck 29. The linear-rotary ball bearing 23 is received within sleeve portion 31 to align the axis of chuck 29 with the longitudinal axis of rotary shaft 15 which, in turn, permits reciprocal movement of sleeve portion 31 along the coincident axes. Movement of sleeve portion 31 is a right hand direction, again as viewed in FIG. 2, is limited by the head of screw 35 which passes through an aperture 36 in sleeve portion 31 and is secured in a suitably located threaded opening in the housing of motor 13. Screw 35 also prevents rotation of chuck housing 29.

Sleeve portion 31 of chuck housing 29 is also provided with a threaded bore 37 which receives stop screw 38. The left hand end of stop screw 38 is aligned with stop button 39 supported on the housing of motor 13.

Compression spring 41 supported between the housing of motor 13 and the left hand end of sleeve portion 31 biases the chuck housing 29 to the right against the head of screw 35. Since engagement of the stop screw 38 with stop button 39 limits the leftward movement as viewed in FIG. 2 of chuck housing 29 it will be apparent that the spacing between stop button 39 and the end of stop screw 38 determines the extent of reciprocal movement of chuck housing 29.

As can be seen from examination of FIGS. 3 and 4 the right hand end of chuck housing 29 is provided with a conduit 43 which is connected to a suitable source of vacuum, such as a shop vacuum cleaner (not shown), to remove chips generated in the cutting operation.

The lens and mold assembly 45 includes lens 46 secured or firmly supported in lens mold 47. Lens 46 has an edge which is adjacent lens mold face 49. Since lens 46 is preferably of hydrophilic hydrogel material it will be appreciated that it is non-rigid when in its hydrated state. However, while in mold 47 lens 46 is maintained in an anhydrous condition. Lens mold 47 is preferably made of material which facilitates the cutting step described below.

In operation an operator inserts the lens and lens mold assembly 45 into chuck portion 33 of chuck housing 29. The complementary diameters of chuck portion 33 and lens mold 47 (as illustrated in FIG. 4) coupled with the aforesaid source of vacuum (supplied via conduit 43) holds surface 49 firmly and squarely against shoulder 34. In this position the lens and mold assembly 45 is substantially symmetrical with respect to the longitudinal axis of shaft 15. The operator then moves chuck housing 29 to the left as viewed in FIG. 2 forcing the face 49 of assembly 45 into the rotating cutter 21 as is shown in FIG. 4. Cutter 21 making an annular circular cut of predetermined depth removes a small amount from the peripheral edge of the lens and a corresponding amount of the face of the lens mold. The removed material is drawn off through conduit 43. The depth of the cut being regulated by the setting of stop screw 38.

Although a preferred embodiment of this invention is illustrated, it is to be understood that various modifications and rearrangements of parts may be inserted to without departing from the scope of the invention disclosed.

I claim:

1. A method of mechanically working an opthalmic lens with a cutting means while said lens is secured to a mold member and constitutes with said mold member a lens and mold assembly, said lens including a surface which is in engagement with said mold member, an exposed surface and a peripheral edge, said mold including an exposed surface adjacent said edge of said lens, said method comprising:
   a. orientating said lens and mold assembly such that said exposed lens surface and said exposed mold surface are both in opposed facing relation to said cutting means;
   b. inducing relative rotational movement between said cutting means and said lens and mold assembly;
   c. engaging said cutting means with said lens and mold assembly;
   d. removing, by cutting away, a portion of said edge of said lens; and
   e. removing, by cutting away, the portion of said exposed mold surface adjacent said edge.

2. The method of as set forth in claim 1 wherein the steps of removing said portion of said edge of said lens and of removing said portion of said exposed mold surface adjacent said edge are carried out simultaneously.

* * * * *